(12) United States Patent
Carapella et al.

(10) Patent No.: US 12,195,928 B2
(45) Date of Patent: Jan. 14, 2025

(54) INFILL FOR USE WITH SYNTHETIC TURF AND METHOD AND APPARATUS FOR PRODUCING SAME

(71) Applicants: G2 Greenplay Organics, LLC, Daniel Island, SC (US); Shine Balachandra Menon, Kerala (IN)

(72) Inventors: Domenic Carapella, Merrick, NY (US); Shine Balachandra Menon, Cochin (IN)

(73) Assignee: G2 GREENPLAY ORGANICS, LLC, Daniel Island, SC (US)

( * ) Notice: Subject to any disclaimer, the term of this patent is extended or adjusted under 35 U.S.C. 154(b) by 54 days.

(21) Appl. No.: 17/377,988

(22) Filed: Jul. 16, 2021

(65) Prior Publication Data

US 2022/0018072 A1    Jan. 20, 2022

Related U.S. Application Data

(60) Provisional application No. 63/053,779, filed on Jul. 20, 2020, provisional application No. 63/140,980, filed on Jan. 25, 2021.

(51) Int. Cl.
*E01C 13/08* (2006.01)
*B32B 5/16* (2006.01)
*B32B 9/02* (2006.01)

(52) U.S. Cl.
CPC ............... *E01C 13/08* (2013.01); *B32B 5/16* (2013.01); *B32B 9/02* (2013.01); *Y10T 428/23921* (2015.04)

(58) Field of Classification Search
CPC ... E01C 13/08; B07B 1/00; Y10T 428/23921; B32B 9/02; B32B 5/16
See application file for complete search history.

(56) References Cited

U.S. PATENT DOCUMENTS

| | | | | |
|---|---|---|---|---|
| 3,703,464 A | * | 11/1972 | Ferm | C02F 1/681 |
| | | | | 210/691 |
| 8,563,099 B2 | | 10/2013 | Gilardi | |
| 9,388,535 B2 | | 7/2016 | Nusca | |
| 2004/0005198 A1 | * | 1/2004 | Spangler | E02B 3/04 |
| | | | | 405/15 |

(Continued)

FOREIGN PATENT DOCUMENTS

| | | |
|---|---|---|
| CN | 2764145 Y | 3/2006 |
| CN | 108840714 | 11/2018 |

(Continued)

OTHER PUBLICATIONS

"Coir" Wikipedia entry as edited on Jan. 22, 2020.*
International Search Report dated Oct. 22, 2021 in the corresponding International Application No. PCT/US21/41994.

*Primary Examiner* — Cheryl Juska
(74) *Attorney, Agent, or Firm* — McAndrews, Held & Malloy, Ltd.

(57) ABSTRACT

An infill material for use with synthetic turf is made from coconut coir strands/filaments by a method which extracts the coir strands/filaments from the coconut and processes the coir strands/filaments to have a length between about 0.05 mm to about 30 mm. The processed coconut coir strands/filaments are water resistant as well as mold and fungus resistant and provide a synthetic turf system more similar to natural grass.

16 Claims, 3 Drawing Sheets

(56) References Cited

U.S. PATENT DOCUMENTS

| | | | |
|---|---|---|---|
| 2004/0124139 A1* | 7/2004 | Talbot | B01D 39/04 |
| | | | 210/150 |
| 2008/0299331 A1* | 12/2008 | Gilardi | E01C 13/08 |
| | | | 428/22 |
| 2009/0113791 A1 | 5/2009 | Bertin et al. | |
| 2010/0166984 A1 | 7/2010 | Nusca | |
| 2012/0279125 A1 | 11/2012 | Nusca et al. | |

FOREIGN PATENT DOCUMENTS

| | | | |
|---|---|---|---|
| CN | 109222496 A * | 1/2019 | |
| EP | 2055834 | 5/2009 | |
| FR | 2692833 A1 * | 12/1993 | ............. A01G 24/25 |
| KR | 10-1301186 B1 | 3/2013 | |
| WO | 2014049531 | 4/2014 | |

\* cited by examiner

INFILL FOR USE WITH SYNTHETIC TURF AND METHOD AND APPARATUS FOR PRODUCING SAME

CROSS-REFERENCE TO RELATED APPLICATIONS

This application claims priority to U.S. Provisional Application No. 63/053,779 filed on Jul. 20, 2020 and U.S. Provisional Application No. 63/140,980 filed Jan. 25, 2021, the disclosures of which are incorporated herein by reference.

FIELD OF THE INVENTION

The present invention generally relates to an organic infill material for use with synthetic turf, and more particularly, to an organic infill material made from plant fibers such as those obtained from coconuts.

BACKGROUND

Synthetic turf fields have become more popular for sports fields. Synthetic turf provides the advantage of reduced maintenance when compared to natural turf which requires regular seeding, watering and mowing.

A typical synthetic turf field includes a mat or base and synthetic, grass-like blades extending upward from the mat. An infill material is provided on top of the mat to hold the blades of synthetic grass upright. The infill material also performs the function of holding the mat down by providing ballast. The infill also typically performs the function of providing resilience, durability and water absorption or water repulsion as the location of use demands, depending on the infill material. Additionally, organic infill materials provide cushioning along with a cooling effect as the water evaporates from the organic infill material. Organic materials used to make infill include, e.g., processed coconuts and cork.

SUMMARY

It is an object of the invention to provide an infill material for use with synthetic turf 100% organic, hypoallergenic and recyclable.

It is a further object of the invention to provide an infill material for use with synthetic turf which is low maintenance, does not require watering and resists mold and fungus.

It is a still further object of the invention to provide an infill material for use with synthetic turf which has a surface temperature comparable to a natural grass surface as well as low abrasion similar to natural grass.

It is another object of the present invention to provide an infill material for use with synthetic turf which is durable, provides a consistent and even infill level across the playing surface and resists shifting, migration and fly-out.

These and other objects of the invention are achieved by an infill material comprising coconut coir strands/filaments having a length between about 0.05 mm to about 30 mm and more preferably having a length between about 0.1 mm to about 20 mm. The coconut coir strands/filaments are the fibrous portion of the coconut used for many years to make rope, mats and fabrics and specifically excludes coconut pith or cocopeat. In one embodiment, a base layer of sand or sand-like material may be used as a first layer of infill on top of the synthetic mat to which the synthetic grass blades are attached. The processed coconut coir strands/filaments form a second layer, on top of the sand or sand-like material to provide a water and mold resistant, durable, resilient, low maintenance, low abrasion, highly permeable, lower temperature infill material for a synthetic grass surface.

More specifically, the infill material may include sand or a sand-like material comprising up to 10% by volume of the infill material, the sand or sand-like material forming a base layer of the infill material and wherein the remainder of the infill material comprises coconut coir strands/filaments adapted to be arranged as a thatch layer between the blades of synthetic turf on top of the sand or sand-like material. In an embodiment, the infill material of coconut strands/filaments has a bulk density of about 0.14 g/cm$^3$, 9 labs/ft$^3$. Furthermore, the infill material has an ASTM F1505 abrasion index of about 28. The infill material preferably has a permeability flow rate of greater than 100 inches/hr., and is water, mold and fungus resistant. In an embodiment, the infill material of coconut coir strands/filaments has a length between about 0.1 mm to about 15 mm, +/−20%.

An artificial turf system including an infill material in accordance with an embodiment of the invention includes a synthetic mat from which synthetic grass blades project, and an infill layer comprising processed coconut coir strands/filaments having a length between about 0.05 mm to about 30 mm. More preferably, the infill layer consists of processed coconut coir strands/filaments having a length between about 0.1 mm to about 15 mm, +/−20%. The artificial turf system may further include sand or sand-like material to form a base layer on top of the synthetic mat and the processed coconut coir strands/filaments are provided on top of the sand or sand-like material to form a thatch layer to hold up the synthetic blades of grass.

The infill material formed in accordance with an embodiment disclosed herein may be made by the method of obtaining the mesocarp from coconuts, the mesocarp including flexible, linear strands of coir and thin wall cells of parenchyma attached to the flexible, linear strands of coir; feeding the mesocarp to a mechanical scutching machine to straighten and separate the flexible, linear strands of coir from the parenchyma to produce an output of straightened flexible, linear strands of coir; feeding the straightened, flexible, linear strands of coir to a size reducing device to reduce the length of the flexible, linear strands to a length between about 0.05 mm to about 30 mm; sieving the reduced size flexible, linear strands of coir output from the size reducing device to obtain the reduced size flexible, linear strands of coir suitable four use as an infill material for synthetic turf. The method may further include that the size reducing device is one of a machine that cuts, shreds, chops, grates and pulverizes the flexible, linear strands of coir. Additionally, the size reducing device may include blowers to remove any powder or dust generated during the step of reducing the length of the flexible, linear strands of coir. The method may further include the step of washing the mesocarp prior to feeding into the scutching machine. The step of washing may also include the use of tank retting. The step of washing may also include the use of sprayers to spray water and/or solvents. The method may further include the step of feeding the output of the scutching machine to a mechanical combing device to further straighten the flexible, linear strands of coir and remove any remaining parenchyma tissues. Still further, the method may include the step of softening the flexible, linear strands of coir with the use of organic softeners prior to feeding the flexible, linear strands of coir to the size reducing device. The method may also include the step of returning any flexible, linear strands of coir which remain in the sieve as being larger than the desired size to the size reducing device for further processing.

An artificial turf playing surface formed in accordance with an embodiment of the disclosed subject matter includes a synthetic mat having a substrate including synthetic grass blades having a bottom attached thereto, and an infill material comprising coconut coir strands/filaments cut to a length of between about 0.05 mm to about 30 mm and adapted to be enmeshed between the synthetic grass blades to form a thatch layer above the mat and at the bottom of the synthetic grass blades.

DESCRIPTION OF THE DRAWINGS

The invention will now be shown with the following description of an exemplary embodiment, with reference to the attached drawings wherein.

DETAILED DESCRIPTION

Figure 1:
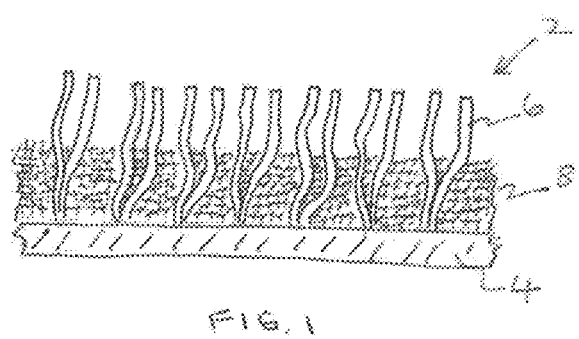
FIG. 1 is a cross-sectional view of synthetic turf including an infill material layer provided therein.

As shown in FIG. 1, a synthetic turf field 2 generally includes a mat or base 4. Blades of synthetic grass 6 have their root held by the mat 4 and the blades extend upwardly from the mat. An infill material 8 is provided to keep the blades 6 upright and to provide a cushion or resilience for the field.

Figure 2:
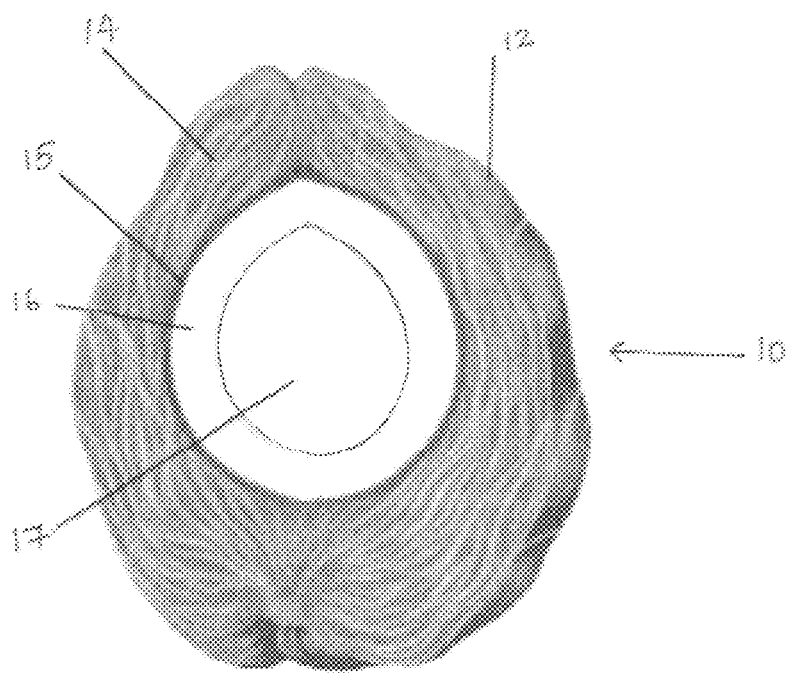
FIG. 2 is a cross-sectional view of a coconut to illustrate the material used from the coconut to make the infill material.
Figure 3A:
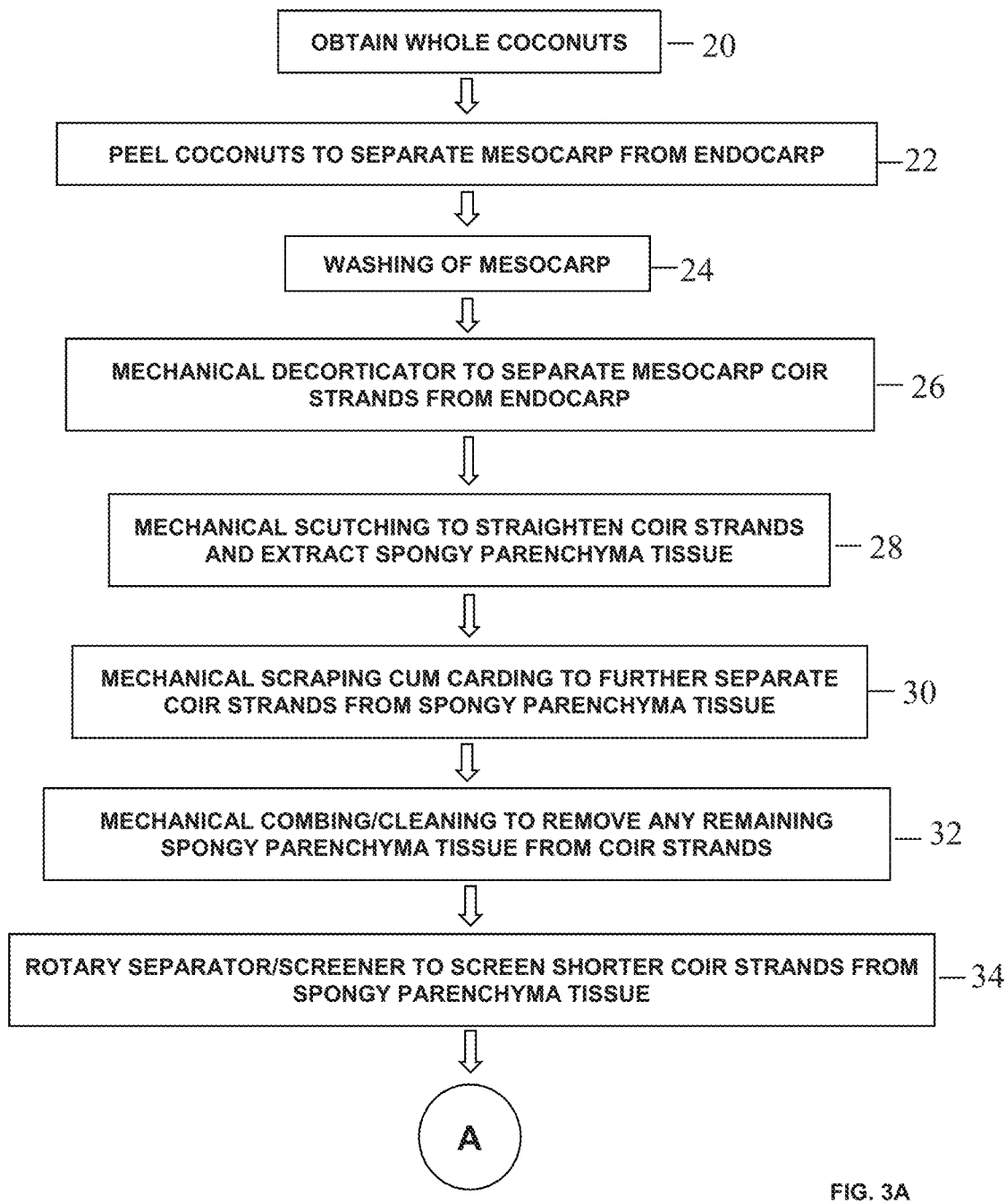
FIGS. 3A and 3B is a flow diagram of an exemplary embodiment of a process for producing infill material made from long plant fibers such as those obtained from a coconut mesocarp.
Figure 3B:
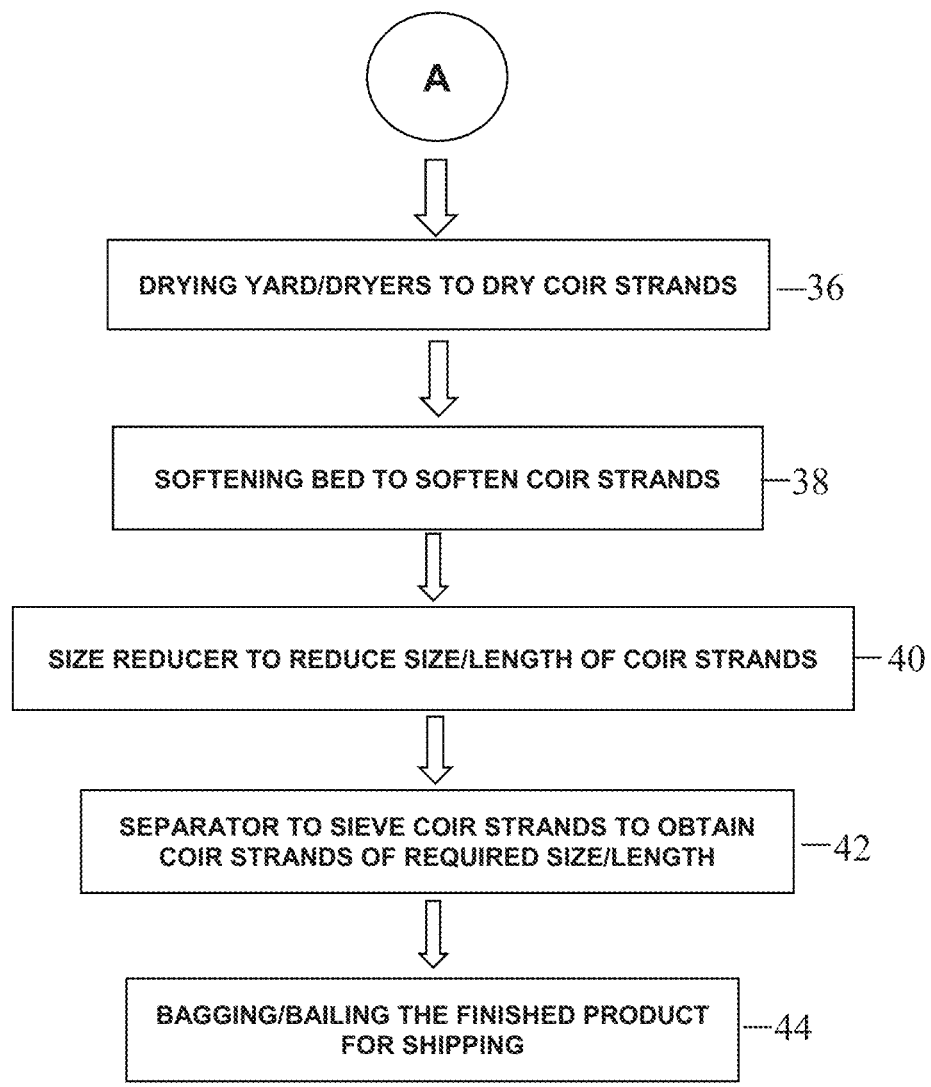

FIG. 2 is a cross-section of a coconut 10. The coconut includes an exocarp outer coat 12 of the coconut. Inside the exocarp outer coat 12 is the mesocarp husk consisting of coir 14 or ductile flexible linear strands/filaments of coir 14. The mesocarp also includes thin wall cells or tissue called parenchyma which are attached to flexible strands of coir 14. In the center is the coconut meat 16 and coconut water 17 covered by a very hard endocarp shell 15 which is the part useful in the food industry.

The coir strands 14 are ductile flexible linear strands/filaments which has been used in products such as floor mats, brushes and rope. The coir strands 14 comprise individual ductile flexible linear strands/filaments which are generally narrow and hollow, with thick walls made of lignin and cellulose. The flexible linear strands/filaments are pale when immature, but later become hardened and yellowed as a layer of lignin is deposited on their walls. The flexible linear strands/filaments consist of cells which are about 1 mm long and 10 to 20 mm in diameter. The flexible linear strands/filaments of coir are typically 10 to 30 cm long. Brown coir is harvested from fully ripened coconuts and is thick, strong and has a high abrasion resistance. Flexible linear strands/filaments of coir 14 are relatively waterproof and non absorbent of water. The flexible linear strands/filaments of coir used to make the infill of the present invention must not be confused with the parenchyma tissue, or otherwise called coir pith, cocopeat or coir granules which is a granular/powdery material resulting during the process of extraction of the flexible coir strands/filaments from the coconut. Unlike flexible coir strands/filaments 14, the parenchyma, or otherwise called coir pith, cocopeat or coir granules can hold large quantities of water, like a sponge. Thus, coir granules, coir pith or cocopeat has been used in place of sphagnum (peat moss) extensively in the field of horticulture.

The present invention uses the chemical free, 100% organic flexible linear strands/filaments of coir 14 to form an infill material used with synthetic turf. The flexible linear strands/filaments of coconut coir 14 may be in the form of full length, chopped, grated, chaffed or decortified. The processed coconut coir 14 may be used alone or in combination with other processed organic vegetable fibers or vegetable granules, and/or plant materials. The infill material may also include synthetic granules such as crumb rubber particles, if desired. The synthetic granules preferably have a size of 0.35 mm-100 mm. The infill may also include a base layer of sand or the like, such as, e.g., siliceous sand and/or quartz with single or aggregate crystal quartz to provide ballast to weigh down the synthetic turf mat or base. The sand or sand-like material preferably has a grain size of about between 0.4 mm-0.9 mm.

Organic vegetable fibers, vegetable granules and plant materials useful for the infill include, but are not limited to, vegetable material derived from defribated or fibrous arboreus plant parts, such as cork, jute, sisal, bamboo, hemp, jute, taboa, fique, abaca, pineapple, curare, aloe vera, rice husk cotton, silk and banana. They are preferably biodegradable and free from extraneous material. The natural fibers and plant materials preferably have a size of 0.2 mm-300 mm, and more preferably between about 0.1 mm and 3 cm.

In one embodiment, the bulk of the infill is preferably made from flexible linear strands/filaments of coconut coir 14. The coir is an organic, flexible, linear, strandular, filament part of a decortified coconut. The flexible linear strands/filaments of coir 14 may be used as an infill in full length fibers. Alternatively, the flexible linear strands/filaments of coir 14 may be chopped, grated or chaffed to form the infill material. The infill material formed from flexible linear strands/filaments of coconut coir is preferably made by decortifying coconut in a coconut decortificator for extracting the flexible linear, strandular, filament coir 14 portion from the coconut. The flexible linear strands/filaments of coir may be used in full length or may be chopped, grated or chaffed using a chopper, grater or chaffer to reduce the size of the fibers. The flexible linear strands/filaments preferably have a heterogeneous granulometry or linear size between about 350 micrometers to several millimeters and even up to about 3000 mm. Preferably, the coir strands/filaments are processed to have a size/length in the range of 0.5 mm-3.0 cm so that the processed coir strands/filaments settle within the tuffs of the turf interlocking themselves creating a netted bedded infill to hold the turf system together and keep the synthetic blades upright as well as provide a cushioning effect along with high resilience for the field. As will be discussed in detail below, the loose flexible infill coir strands/filaments of the present invention obtained by the above process is preferably passed directly through a linear vibratory screen that separates the powder part from the specified size range of flexible coir strands/filaments. The powder is removed from the system and the processed coir strands/filaments forming the infill material of the present invention may be stored in, e.g., jumbo bags.

The processed flexible coir strands/filaments forming the infill material of the present invention is arranged, filled and/or bedded all around the synthetic turf blades. The coir infill material may be used alone, or in combination with other materials. For example, the coir infill may be used with a sand or sand-like ballast. The coir infill processed strands/filaments may also be used with or without additional organic material such as cork, as well as synthetic granules such a processed rubber. The organic infill material formed in accordance with the present invention may consist of 100% processed flexible linear strands/filaments of coir or down to a minimum of about 10% by volume. The other natural plant and/or vegetable fibers, granules and/or plant materials may comprise between about 0% to 90% of the infill material. The synthetic granules may likewise comprise between about 0% to 90% of the infill material. Lastly, the sand or sand-like material may comprise between about 0% to 90% of the infill material. For example, the sand or sand-like ballast material may be used to provide a ballast of about 3 lbs. per square foot.

The use of flexible linear strands/filaments of coconut coir as the majority of an infill material provides many advantages over known infill materials The processed coir infill material formed in accordance with the present invention is preferably weaved and interlocked within the tufts of the turf creating a netted bedded infill system which provides high air porosity through the weaves thus creating a cool playing surface due to moisture evaporation. The netted bedded processed coir strands/filaments provide a thatch layer with little to no fly out. Furthermore, the above coconut coir strands/filaments are organic, hypoallergenic, resistant to mold and fungus, biodegradable and eco-friendly, thereby eliminating end of life disposal costs. The coir materials in the infill formed in accordance with the present invention are recyclable and/or reusable, for e.g., in agriculture as a soil oxygenator, stabilizer or top dressing and disposal is environmentally friendly. The processed coconut coir strands/filaments to make the infill material for synthetic turf are also obtained from a renewable source, e.g., coconut. The processed coconut coir strands/filaments forming the infill material in accordance with an embodiment of the present invention provides environmental sustainability. The coconut coir strands/fibers are preferably obtained from coconuts subject to protected food source harvesting. Additionally, the processed coconut coir strands/filaments infill material are packaged for minimal carbon impact, i.e., a typical football field would only require a single trailer filled with the processed coconut coir strands/filaments infill material. The infill material discussed above also has a very low bulk impact having extremely low weight mobilization such that a full size football field typically uses less than 80,000 lbs. of processed coconut coir strands/filaments formed in accordance with the invention.

The infill material formed from flexible linear strands/filament of coconut coir in full length/chopped/grated/chaffed form, preferably with a length in the range of about 0.5 mm-3.0 cm and more preferably between about 0.1-15 mm +/−20% settle within the tufts of the turf interlocking themselves creating a netted bedded thatch layer of infill holding together the turf system. This netted bedded thatch layer of infill of the present invention provides a cushioning effect along with high resilience for the field. Specifically, the flexible linear strands/filaments of coconut coir in full length/chopped/grated/chaffed form have resiliency properties due to their high tensile strength and their springy characteristics. Due to their high tensile strength and impact resistance, flexible linear strands/filaments of coconut coir are used in coir door/floor/foot mats and coir ropes all over the world. The tensile strength and micro-capillary hollow structure of these linear strands/filaments helps the coir infill of the present invention regain its shape after impact. High tensile strength, higher bulk density and interlocking of the coir strands/filaments makes the infill resistant to blowing away and keeps the infill intact.

As it is known in the field of synthetic turf, it is critical to maintain an even and consistent infill level across the playing surface. For example, when a foot is raised in play, it should return down the same distance no matter where it is on the surface. Divots and recessed infill areas which are common with synthetic granular type infills greatly contribute to player injuries. The 100% organic processed coconut coir strands/filaments provide a very stable infill matrix by providing a dense, natural thatch layer that resists shifting and migration. The processed coconut coir strands/filaments are some of the strongest plant fibers known and lock into place within the synthetic grass fibers to provide surface stability with little or no fly out.

The infill material formed in accordance with an embodiment of the invention made from processed coconut coir strands/filaments also provides improved performance compared to prior art infill materials such as rubber granules. The processed coconut coir strands/filaments has a low average abrasion index of 28 as compared to natural grass which has an abrasion index of 20 (See ASTM F1505). Thus, an artificial turf field using the processed coconut coir strands/filaments in accordance with an embodiment of the invention is comparable to a natural grass field; however, it is far more durable and will provide years of consistent play with much less maintenance. For example, a turf system using the infill material made from processed coconut coir strands/filaments in accordance with an embodiment of the invention was subjected to 20,000 cycles using a Lisport machine which simulates 8 years of use on the turf system including the synthetic blades and infill material. The processed coconut coir strands/filaments showed minimal break down of material composition of the infill sample and exhibited less than 7% average variance per sieve. Specifically, the tested infill sample particle size range did not significantly change after undergoing the Lisport testing procedure and the coir fiber size range remained less than 0.2-0.5 mm before and after the 20,000 cycles. Thus, the 100% organic processed coconut coir strands/filaments forming the infill material is highly durable while providing low abrasion.

The infill material made of processed coconut coir strands/filaments also provides lower turf temperatures closer to natural grass. As discussed above, the processed coconut coir strands/filaments infill material does not require any watering. Instead, the processed coconut coir strands/filaments infill material is water resistant such that it resists rot, mold and fungus. The durable processed coconut coir strands/filaments have a very low bulk density that is naturally resistant to solar radiation heat absorption. Furthermore, when natural moisture is available from rainfall or by watering when desired, most of the water passes through the turf and is trapped or enmeshed between the processed coconut coir strands/filaments forming a thatch layer and retained over time to promote prolonged cooling effects that keep the playing field cooler and safer and more similar to natural grass. Using the FIFA Test Method 14 and a specified heating apparatus, natural grass, a turf system (both wet and dry) using the processed coconut coir strands/filaments infill material and a turf system using rubber granules and sand (dry) were tested after a duration of 3 hours with an ambient temperature of 95° F. The natural grass temperature was 102° F. The wet processed coconut coir strands/filaments infill material in accordance with an embodiment of the invention had a temperature reading of 109° F., and the dry had a reading of 122° F. The dry turf system using the rubber and sand had a temperature reading of 142° F. Thus, the processed coconut coir strands/filaments infill material provides improved cooling for the field surface such that when wet, it is within 10° F. of natural grass and when dry, within 20° F. of natural grass.

Furthermore, a turf system using the processed coconut coir strands/filaments infill material in accordance with an embodiment of the invention provides enhanced water management and can retain an average of 50,000 gallons of water enmeshed within the coir strands/filaments. The processed coconut coir strands/filaments infill material also provides a water pathway between the strands that can store moisture for prolonged periods of time. Notwithstanding the above, the processed coconut coir strands/filaments infill material conserves water and does not require any irrigation to maintain cooling and durability advantages.

The processed coconut coir strands/filaments infill material provides enhanced safety for health and play. The origin of the coconut coir 14 is preferably from a select, pesticide-free source of virgin plant materials. The coconut coir 14 has a natural tan earth tone. The processed coconut coir strands/filaments infill material does not break down, splinter or create dust, and is OMRI listed 100% organic plant-based material, which complies with the California Organic Products Act (COPA). Since the processed coconut coir strands/filaments infill material is 100% organic plant-based material, it also is bio safe, i.e., protects humans and our environment from exposure to harmful metals, chemicals and compounds. Toxicology testing is now commonly used to gauge the safety of infill materials used in artificial turf playing fields. One such important test is known as the PFAS (polyfluoroalkyl substances) test, designed to detect for PFCs and several other analytes, known as "forever chemicals" that do not break down in the environment. The processed coconut coir strands/filaments infill material in accordance with an embodiment of the invention was subjected to the PFAS test (ASTM D7968-17M) and no PFCs or other analytes were detected.

The 100% organic coconut coir strands/filaments 14 used to make the present infill material is highly resistant to rot and decay. These coir fibers 14 have been used for hundreds of years to produce rope, matting and fabrics. Due to its durability, the coconut coir strands/filaments 14 provide grass-like performance and meets all STC/One Turf standards for rotational resistance, vertical deformation, ball rebound and force reduction. The processed coconut coir strands/filaments forming the infill material in accordance with an embodiment of the invention is also highly permeable, having a flow rate of greater than 100 inches/hour (using the EN 12616 Metered A, 2003, 117 inches/hr. with a 2 inch turf using a ShockDrain 580™ pad, an engineered pad of thermoplastic elastomers polyolefin composites (TEPC) manufactured by En-Plast Technology, LLC) which eliminates pooling on the playing surface.

The processed coconut coir strands/filaments infill material has a typical fiber diameter of between about 0.05-0.3 mm and a preferred fiber length of between about 0.1-15 mm +/−20%. The infill material has a bulk density of 0.142 g/cm$^3$ (9 lb./ft.$^3$). The coconut coir fibers have a natural tan earth tone to provide better aesthetics as compared to black rubber granuals.

A further advantage of the coir infill material which creates a netted bedded system is that it provides a thorough drainage system during heavy rains. The non absorption and water proofing characteristics of the coir strands/filaments add to this property. Accordingly, the linear strands/filaments of coconut coir has a very long life span in comparison to other natural plant materials. They are naturally weather resistant, water resistant and resistant to molds, fungus and bacteria. The coir infill material of the present invention has high resistance to mechanical impacts due to the hardness created by a very high presence of lignin bonded to cellulose within. The coir infill of the present invention is non reactant to normal water, salt water and most of the commonly occurring chemicals. That is why these coir strands/filaments are used in coir mats, coir ropes, coir netting, cricket mats, coir geo-textiles, seawall barriers, etc.

The embodiment discussed in detail above uses the flexible linear strands/filaments of coir 14 to form the majority of an infill material used with synthetic turf. However, it is contemplated that any fibrous plant material may be used in the process outlined below to make infill material. Suitable fibrous plant materials include, but are not limited to, hemp, bamboo, sisal, jute, taboa, fique, abaca, pineapple, curava, banana, aloe vera, rice husk, cotton and silk.

The process to extract the flexible linear strands/filaments of coir 14 from the coconut and further process the coir into an infill material in accordance with the present invention is set forth in detail below.

Whole coconuts, green or otherwise more mature 20 are provided to a peeler. The peeler is either a hand peeler or a mechanical peeler to separate the mesocarp 14 from the endocarp shell 15 which is the seed or part useful in the food industry 22. Preferably, the mesocarp is obtained from a coconut processor who has removed the food part of the coconut. In a preferred embodiment, the mesocarp is sourced regionally in its natural state and not dehydrated, or compressed into bricks or bales for shipping. Both brown and white coir fibers 14 may be used. Once the mesocarp is separated from the whole coconut, it passes through a water treatment or washing station 24. The washing station may be in the form of a retting tank, water and/or solvent sprayers or other known techniques for cleaning the mesocarp to prepare it for extraction/separation from the parenchyma tissue. The washing station may operate by immersing the mesocarp in tanks containing a saline solution or by spraying the mesocarp with a saline solution. The cleaning process also helps to prevent particles of sand or other materials from reducing the purity of the final product or damaging the cutting tools. Once washed, the clean, wet mesocarp is loaded into a hopper.

The hopper feeds the wet mesocarp to a mechanical decorticator. The decorticator is designed to separate the flexible linear strands/filaments of coir 14 from other parts of the coconut including any remaining exocarp outer shell 26.

The next phase in the process includes extracting the wet spongy tissues or parenchyma from the flexible linear strands/filaments of coir 14. This phase may include three separate steps the first of which is to feed the coconut material from the decorticator to a mechanical scutching machine. The scutching machine straightens the mesocarp flexible linear strands/filaments of coir 14 as well as extracts the wet, spongy parenchyma from the coir strands 28. From the output of the scutching machine, the processed coir strands 14 are fed into a mechanical scraping cum carding machine. The mechanical scraping cum carding machine further separates the mesocarp spongy parenchyma tissues from the coir strands 30.

The last step in extracting/separating the coir strands 14 includes a mechanical combing or cleaning 32. The mechanical combing or cleaning removes any remaining mesocarp spongy parenchyma tissues from the long flexible linear strands/filaments or coir 14 which coir strands 14 will be further processed to form the organic infill material. The mechanical combing also arranges the coir strands 14 to be linearly arranged for further processing, such as size reduction by, e.g., cutting.

The moisture laden spongy mesocarp parenchyma tissues separated from the long coir strands in the previous step are fed to a rotary separator or screener. The separator separates out any shorter coir strands 14 which may be used in the infill material for synthetic turf 34. At this point all the flexible coir strands have been separated from the whole coconut at the start of the process. The coir strands 14, both long and the short, are preferably moved to dryers and/or a drying yard, if desired, to remove any excess moisture from the coir strands 36.

Once the coir strands 14 have been separated and, if desired, dried, the coir strands 14 may be softened using softeners, and preferably organic softeners, in a softener bed 38. Softeners include but are not limited to solutions of sodium hydroxide, sodium carbonate, sodium hypochlorite, urea, Turkey red oil, hydrochloric acid, sulphuric acid, cellulose (enzyme) and combinations thereof. The step of softening is not necessary but may be desired to make the coir strands 14 softer to the touch.

The straightened, combed and separated coir strands 14 are fed into a machine to reduce the length of the coir strands 14 to the desired size 40. The size reducers may be in the form of a mechanical disintegrator, shredders, cutters, choppers, graters and/or pulverizers. By way of example, the size reduction process may be accomplished by a cutting operation carried out by different types of machines. One such machine may include a blade and counter blade or by means of a rotating drum. The use of such machines makes it possible to obtain a clean cut of the coir strands 14 to a desired size/length. Furthermore, the cutting operation is carried out in a direction transverse, preferably perpendicular, to the direction of the coir strands 14 to allow for substantially uniform cutting of the coir strands 14. In a preferred process, the size reducer may also include blowers and/or dust removers to remove any powder or dust formed during the process of size reducing the coir strands 14. Machinery such as cutters, choppers, grinders, shredders and pulverizers may be used individually or collectively. Furthermore, the size reducing process may be repeated as necessary to obtain coir strands 14 having the desired length. Preferably, the coir strands/filaments 14 are processed to have a substantially heterogeneous granulometry or linear size between about 350 micrometers to 3 meters. More preferably, the coir strands 14 are processed to have a size/length in the range of about 0.05 mm-3.0 cm, and more preferably in the range of about 0.1 mm-15 mm +/−20%. The coir strands 14 typically have a fiber diameter in the range of 0.05 mm-0.3 mm.

Once the size/length of the coir strands 14 has been processed to approximately the desired size, the shredded, cut, chopped, grated and/or pulverized coir strands 14 are fed to a separator or screener which can be either a linear or rotary device to sieve the coir strands 14 for the required size limitations 42. The coir strands which are larger than the desired size are processed again by being placed in the size reducer. Any remaining powder or fines may be removed from the processed coir strands through cyclonic dust collectors. The final properly sized coir strands are ready to be used as a turf infill. Preferably, sorted white and brown coir strands of the desired length of 0.5 mm-15 mm +/−20% may be blended to a desired ratio. White coir strands may provide 10-90% of the combined blend and brown coir strands likewise may provide 10-90% of the combined blend. Stated otherwise, the white and brown processed coir strands 14 are blended in proportion with each not exceeding about 90% with a minimum of about 10% of the other. The final infill product material is moved to a bagging or bailing station where the material is bagged/bailed and if desired, compressed and sealed for shipping 44.

In an alternative embodiment, the properly sized coir strands may be combined with coconut husk chips and/or areca husk chips having an approximate size of 0.5 mm-15 mm. The coconut husk chips and areca husk chips may be obtained from sources who process the coconut husks and areca husks. Typical sizes of such processed husks are about 6 mm-18 mm. If desired, the husk chips may be cut or chopped to a smaller size having a length of about 0.5 mm-15 mm for blending with the processed coir strands 14. The processed coconut husk chips and/or areca husk chips may be blended with the processed coir strands 14 to a ratio between about 5%-95% and more preferably between about 5%-65%. Once again, when the desired blend is achieved, the processed infill material may be compressed into bags for shipping.

Those skilled in the art will understand and appreciate that the specification is not intended to limit the scope of the present invention to the disclosed embodiments or to be used to limit the scope of the claims. While the present invention has been described with reference to exemplary embodiments, it will be understood by those skilled in the art that various changes can be made and equivalents can be substituted for elements thereof without departing from the scope of the present disclosure. In addition, many modifications can be made to adapt to a particular situation without departing from the scope of the disclosure. Therefore, it is intended that the present disclosure not be limited to any particular embodiments disclosed, but that the disclosure include all embodiments falling within the scope and spirit of the invention.

What is claimed is:

1. An artificial turf system comprising:
a synthetic mat from which synthetic grass blades project, and
an infill layer consisting of a coconut-derived infill material
(a) alone, or
(b) in combination with non-coconut derived organic material, synthetic granules, or both;
wherein the coconut-derived infill material consists of:
non-granular coconut coir strands/filaments obtained from a mesocarp of a coconut and separated from parenchyma,
the non-granular coconut coir strands/filaments having a length between about 0.05 mm and 30 mm; and
in which the coconut-derived infill material makes up a majority of the infill layer.

2. The artificial turf system of claim 1, wherein the coconut coir strands/filaments have a length between about 0.5 mm and about 30 mm.

3. The artificial turf system according to claim 1, wherein the coconut coir strands/filaments have a length between about 0.1 mm and about 15 mm.

4. The artificial turf system of claim 1, wherein the coconut coir strands/filaments have a diameter between about 0.05 mm to 0.3 mm.

5. The artificial turf system of claim 1, wherein the coconut-derived infill material has a bulk density of about 9 lbs/ft$^3$.

6. The artificial turf system of claim 1, wherein the artificial turf system has an ASTM F1505 abrasion index of about 28.

7. The artificial turf system according to claim 1, further comprising sand to form a base layer on top of the synthetic mat, and wherein the coconut-derived infill material is provided on top of the sand.

8. The artificial turf system of claim 1, wherein the infill layer consists of the coconut-derived infill material alone.

9. The artificial turf system of claim 1, in which the coconut-derived infill material is made by the steps of:
   obtaining mesocarp from coconuts, the mesocarp including flexible, linear strands of coir and parenchyma attached to the flexible, linear strands of coir;
   feeding the mesocarp to a mechanical scutching machine to straighten and separate the flexible, linear strands of coir from the parenchyma to produce an output of straightened flexible, linear strands of coir;
   feeding the straightened, flexible, linear strands of coir to a size reducing device to reduce the length of the flexible, linear strands to a length between about 0.05 mm and about 30 mm;
   sieving the flexible, linear strands of coir output from the size reducing device to obtain reduced size flexible, linear strands of coir.

10. The artificial turf system of claim 9, wherein the size reducing device is one of a machine that cuts, shreds, chops, grates and pulverizes the flexible, linear strands of coir.

11. The artificial turf system of claim 9, wherein the size reducing device includes blowers to remove any powder or dust generated during the step of reducing the length of the flexible, linear strands of coir.

12. The artificial turf system of claim 9, wherein the steps further comprise washing the mesocarp prior to feeding into the scutching machine.

13. The artificial turf system of claim 12, wherein washing includes the use of tank retting or the use of sprayers to spray water and/or solvents.

14. The artificial turf system of claim 9, wherein the steps further comprise feeding the output of the scutching machine to a mechanical combing device to further straighten the flexible, linear strands of coir and remove any remaining parenchyma tissues.

15. The artificial turf system of claim 9, wherein the steps further comprise softening the flexible, linear strands of coir with the use of organic softeners prior to feeding the flexible, linear strands of coir to the size reducing device.

16. The artificial turf system of claim 9, wherein flexible, linear strands of coir which remain in the sieve as being larger than the desired size are fed to the size reducing device for further processing.

\* \* \* \* \*